United States Patent [19]

Lieb

[11] Patent Number: 4,846,341
[45] Date of Patent: Jul. 11, 1989

[54] FOOD PRODUCT PEEL CATCHING DEVICE

[76] Inventor: Margot Lieb, 513 S. Pitney Rd., Absecon, N.J. 08201

[21] Appl. No.: 217,339

[22] Filed: Jul. 11, 1988

[51] Int. Cl.[4] .............................................. B65D 6/20
[52] U.S. Cl. ....................................... 206/216; 30/124
[58] Field of Search ................. 30/128, 124, 136, 278, 30/123.5; 206/216; 220/84; 99/584

[56] References Cited

U.S. PATENT DOCUMENTS

| 2,912,755 | 11/1959 | Twyman | 30/124 X |
| 3,105,617 | 10/1963 | Felldin | 220/84 X |
| 3,199,560 | 8/1965 | O'Donovan | 30/124 X |
| 4,166,572 | 9/1979 | Leeds | 206/216 X |
| 4,369,574 | 1/1983 | Hsien-Sen | 30/123.5 |

FOREIGN PATENT DOCUMENTS 2501990  9/1982  France ................................. 30/124

Primary Examiner—Stephen Hepperle
Attorney, Agent, or Firm—H. Jay Spiegel

[57] ABSTRACT

Disclosed herein is a device designed to catch food product peels for easy disposal when a food product is being peeled for consumption. The device includes a chamber defined by mesh which is supported by a frame supporting the mesh. The frame is mounted on a base having contained therein a cutting board which may be selectively slid out of the base or stored therein. The above described frame is foldable against the base allowing easy storage of the device.

10 Claims, 1 Drawing Sheet

U.S. Patent  Jul. 11, 1989  4,846,341
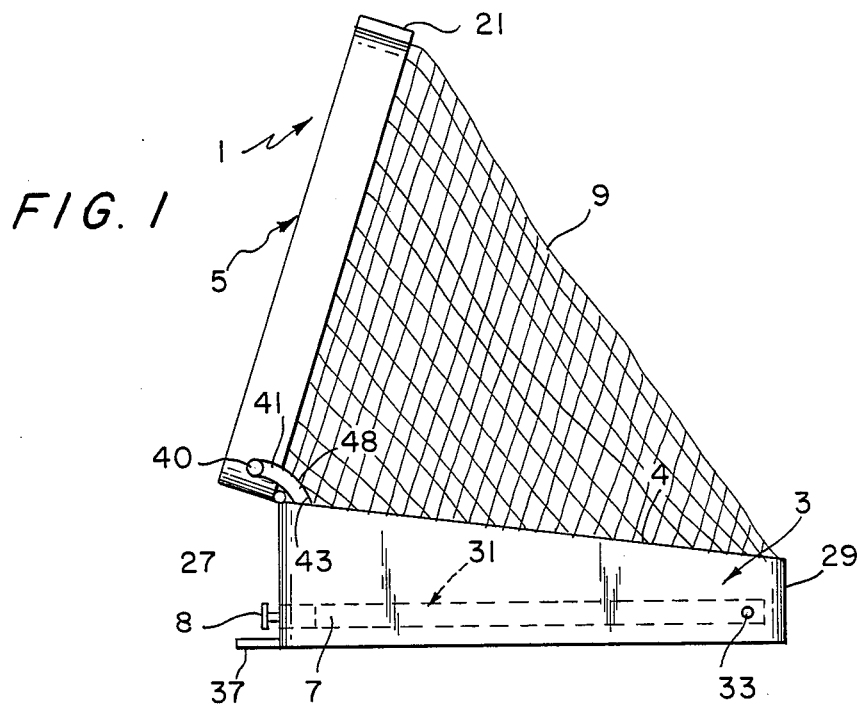
FIG. 1
FIG. 2
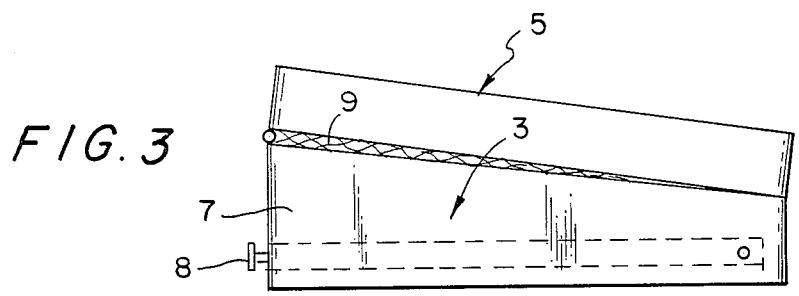
FIG. 3

FOOD PRODUCT PEEL CATCHING DEVICE

BACKGROUND OF THE INVENTION

The present invention is related to a food product peel catching device. In the prior art, it is known to provide a food peeling device with means for catching peels created thereby. However, to the knowledge of applicant, the prior art does not teach the concept of a peel catching device including a foldable chamber defined by a mesh net with such device also included with the provision of a cutting board.

The following prior art is known to applicant:

U.S. Pat. No. 2,912,755 to Twyman discloses a potato peeler having a chamber incorporated therewith designed to store the peels which are formed during the peeling of a potato.

U.S. Pat. No. 4,369,574 to Hsien-sen discloses a peeling device having a chamber designed to store peels which are created thereby.

Neither of the above discussed United States patents teaches the concept of a device designed to easily store peels created by a separate peeling device.

SUMMARY OF THE INVENTION

The present invention includes the following interrelated aspects and features:

(a) In a first aspect, the present invention includes a base having a top surface inclined from front to rear. Mounted on the top surface of the base is a pivoting frame which may lie flat against the top surface in one position thereof or may be pivoted to an upright position and locked there by a locking mechanism formed in the hinges thereof.

(b) A mesh net is mounted above the frame on one end thereof and at its other end is mounted peripherally about the top surface of the base to define a chamber having a mesh net as its outer walls. Thus, when the frame is pivoted to its upright position and locked there, a chamber is formed by the mesh net into which peels may be caught and stored.

(c) In a further aspect, a chamber is formed as a base in which is stored a cutting board, which cutting board may be slid out from the chamber to a position where the cutting board may be employed. If desired, a hook may be attached to the underside of the base allowing the inventive device to be hung from a wall or other support when not in use with the frame lying flat against the base so that the device is stored in a relatively flat configuration.

Accordingly, it is a first object of the present invention to provide a food product peel catching device.

It is a further object of the present invention to provide such a device wherein a mesh net may be formed into a chamber designed to catch peels which are being peeled from a food product.

It is a yet further object of the present invention to provide such a device having a further provision of a cutting board which may be selectively stored or exposed for use.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a side view of the present invention with the frame thereof pivoted to an upright position.

FIG. 2 shows a view from the same direction as the view of FIG. 1, but with the frame pivoted to lie flat against the top surface of the base of the present invention.

FIG. 3 shows a front view of the present invention with the frame thereof in the position shown in FIG. 1.

SPECIFIC DESCRIPTION OF THE PREFERRED EMBODIMENT

With reference to the figures, the present invention is generally designated by the reference numeral 1 and is seen to include a base 3, a frame 5, a cutting board 7 and a mesh net 9.

With reference to FIG. 3, the frame 5 includes two upright portions 11, 13 and a horizontal top portion 15 connected to the portions 11 and 13 by virtue of rounded corners 17 and 19. A loop 21 is provided on the top portion 15 to allow the frame 5 to be pivoted between its operative positions.

At the respective bottoms of the side portions 11 and 13, pivots 23 and 25 are provided which mount the frame 5 to the base 3 and allow it to pivot between the position shown in FIGS. 1 and 3, and the position shown in FIG. 2. If desired, the pivots 23 and 25 may include detent structure as is well known in the prior art to allow the frame 5 to be locked in the position shown in FIGS. 1 and 3 to maintain the upright nature thereof. Furthermore, a further detent (not shown) may be provided to lock the frame 5 in the position shown in FIG. 2.

With particular reference to FIGS. 1 and 3, the mesh net 9 is attached not only to the periphery of the frame 5 by any suitable means, but is also attached to the periphery of a top surface 4 of the base 3 so that the mesh net 9 defines between the surface 4 and the periphery of the frame 5 an enclosing chamber when the frame 5 is at a osition shown in FIGS. 1 and 3. The top surface 4 is sloped from the front surface 27 of the base to the rear surface 29 thereof so that peels which are peeled into the chamber formed by the mesh net 9 are more likely to be retained therein by gravity forces.

As seen in the Figures, the base 3 has an internal chamber 31 in which is slidably contained a cutting board 7 having a handle 8 which may be grasped by the user to allow the cutting board to be pulled out of the base 3 when use of the cutting board 7 is desired. If desired, the cutting board 7 may be entirely removable from the base 3, however, in the preferred embodiment, it is desired that the cutting board include guide means 33 protruding laterally outwardly and sliding in complementary grooves 35 which grooves terminate rearward of the front surface 27 of the base 3 to provide a limit stop preventing the complete removal of the cutting board 7 from the base 3.

A wall hanging device in the form of a hook 37 is provided on the base 3 so that when a frame 5 has been folded to the position shown in FIG. 2, the inventive device 1 may be easily hung from a wall or other support.

In the operation of the present invention, when it is desired to use the device 1 to catch peels which are being peeled from a food product by a suitable implement, the frame 5 is pivoted to the position shown in FIGS. 1 and 3 and is locked there by suitable means such as the detent described above in the hinges or, alternatively, by the hinge 40 having arms 41 and 43 mounted together at pivot 45 and also respectively pivotably mounted to the frame 5 and base 3 top surface 4.

Thereafter, the food products are peeled by holding them in front of the opening formed by the frame 5 so that the peels are projected into the chamber formed by the mesh net 9 where they may fall to the surface 4 of the base 3 which due to its inclined nature will aid in retaining the peels therein. After the peeling operation has been completed, the device may easily be transported to a garbage container where the peels may be dumped.

If it is desired to use the cutting board 7 during the peeling operation or for other purposes, the cutting board 7 may easily be slid out by grasping the handle 8 thereof and pulling the cutting board 7 out from the chamber 31. When not in use, the device 1 may be stored on a wall or other support by virtue of the wall hanger 37.

As such, an invention has been described in terms of a preferred embodiment thereof which fulfills each and every one of the objects of the invention as set forth hereinabove and provides a new and useful device for use in conjunction with peeling operations.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A food product peel catching device, comprising:
    (a) a base having a bottom adapted to support said base on a flat surface, and a top surface inclined with respect to said bottom;
    (b) a frame mounted on said top surface and having an opening therethrough;
    (c) a net connected between said frame and said top surface to define an enclosed chamber therebetween;
    (d) whereby food products that are peeled in a direction of said enclosed chamber may be caught therein and retained thereby.

2. The invention of claim 1, wherein said frame is pivotably mounted to said base between a first upright position allowing said net to create said enclosed chamber, and a second lowered position wherein said frame and net lie flat against said top surface.

3. The invention of claim 1, wherein said net comprises a plastic mesh.

4. The invention of claim 1, wherein said base includes an internal chamber in which is slidably mounted a board, said board being slidable into and out of said chamber.

5. The invention of claim 4, wherein said board comprises a cutting board.

6. The invention of claim 5, wherein said cutting board has guide means attached thereto which guide said cutting board in slidable movements within said internal chamber.

7. The invention of claim 6, further including means for preventing complete removal of said cutting board from said internal chamber.

8. The invention of claim 2, wherein said frame includes locking means for locking the position of said frame in said first upright position and second lowered position.

9. The invention of claim 8, wherein said locking means comprises a hinge pivotably attached to said base and said frame and having said locking means incorporated therein.

10. The invention of claim 1, further including a hook attached to said base and adapted to facilitate hanging of said device on an associated support.

* * * * *